Patented Apr. 4, 1939

2,152,890

UNITED STATES PATENT OFFICE 2,152,890

PROCESS FOR THE PRODUCTION OF CHLORINATED UNSATURATED PETROLEUM HYDROCARBONS

Herman B. Kipper, Accord, Mass.

No Drawing. Application July 7, 1936, Serial No. 89,463

6 Claims. (Cl. 260—654)

The applicant has found that unsaturated petroleum hydrocarbons into which the amino group has been introduced act not only as suitable carriers for pigments used in paints, but also resemble the so-called oxidizing oils, such as linseed oil, and form true films for pigment retention when applied in thin or suitable paint layers, to surfaces of materials exposed to air. It will be understood that both the presence of the amino group and unsaturation of the hydrocarbons are essential; furthermore, if these two conditions are met, hydroxyl or aldehyde groups in the hydrocarbon structure apparently further increase the speed of oxidation and hence pigment, or paint, film formation.

The applicant has produced oils of the character described by a number of methods. For instance, partial oxidation, that is partial removal of hydrogen, is brought about, together with or without splitting of the molecules, or cracking, either simultaneously with chlorination or previous to chlorination, which may be established with a second step, or again chlorination is primarily produced and partial oxidation of the chlorinated hydrocarbons follows. This invention relates to the process of producing these unsaturated chlorinated petroleum hydrocarbons. Subsequently, the chlorinated hydrocarbons are treated with gaseous ammonia in the presence of small percentages of water, under fairly high temperatures and pressures to produce amino hydrocarbons. Strictly anhydrous ammonia was found very inactive in the latter reactions. A twenty-five percent aqueous ammonia or ammonium hydroxide was found also unsuitable, due probably to hydrolytic action or formation of hydroxyl compounds. In other words, small percentages of water present in the reaction field appear to act catalytically, whereas large percentages apparently tend to produce hydrocarbon saturation and alcohol or hydroxyl formation, or at least to prevent "amination." Thus a combination of anhydrous ammonia and ammonia liquor, or water in small percentages, were found most advantageous. Circulation or stirring of the reaction mass during the period of reaction is also advantageous. Finely divided catalytic iron dispersed throughout the reaction mass was found also to act positively or to hasten reaction. With its use, direct "amination" without previous chlorination was found possible.

In the production of simultaneous chlorination and oxidation chlorine was mixed with air and the latter reduced to about ten percent oxygen content by admixture with nitrogen. I used a steel cylinder of about two cubic feet for this gas-mixing reservoir. The reserver was first evacuated and about two hundred grams of chlorine run into it. Air was then pumped into the cylinder to about seventy-five to a hundred pounds gauge pressure and nitrogen gas subsequently forced into the same to about a hundred and fifty pounds pressure. A chrome-nickel-iron tube six feet long, one and one-half inches internal diameter, was used as the reaction chamber. This was heated in an electric resistance furnace. The tube was loosely packed with shredded asbestos, on which copper chloride was spread as the reaction catalyst.

To carry out the chlorination-oxidation reaction, temperatures of from one hundred and fifty to four hundred degrees centigrade were used, dependent on the gravity, and hence boiling points, of the oils employed and about thirty pounds superatmospheric pressure was usually utilized. One to two grams per minute of oil were pumped through the reaction tube. About five hundred to one thousand cubic centimeters, measured at atmospheric pressure, per minute, of the chlorine-oxygen-nitrogen gas mixture were simultaneously passed through the reaction tube. The chlorinated oxidized oil was collected in a steel reservoir under pressure, from which the oil was decanted off.

Oxidation alone was carried out practically in the same manner with omission of chlorine. Chlorination subsequently was produced by simply passing chlorine through the hydrocarbon oil. If sufficiently unsaturated the oil will absorb practically all the chlorine, when placed under sufficiently high atmospheric pressure; for instance, four hundred to a thousand pounds. The hydrochloric acid gas given off can then be practically completely utilized in the reaction, or about half of it used for other purposes, since under atmospheric pressure about half of the chlorine is given off as the acid gas. Chlorination of the original hydrocarbons was carried out also by passing chlorine and the hydrocarbon oils simultaneously through the reaction tube and subsequently such chlorinated oils were oxidized. More truly theoretical chlorinations and oxidations were attained by carrying out chlorination and oxidation separately. In simultaneous chlorination and oxidation the hydrochloric acid gas liberated is partially oxidized back to chlorine so that chlorination tends to predominate over oxidation.

In producing amination shredded asbestos, on which finely divided active or catalytic iron was deposited and moistened with water, was placed in the bottom of the angularly inclined reaction tube, the oil was run in and the tube evacuated. Ammonia gas was then passed into the tube, five to ten percent on the weight of oil. The tube was then heated for about an hour at two hundred degrees centigrade. After filtration the oil thereby produced was satisfactory for use as an oxidizing oil. Sufficient ammonia was used to produce about half saturation of the unsaturated conditions of the hydrocarbons as determined by bromine absorption values.

Although through the employment of ammonia I secured the most efficient atmospheric oxidizing hydrocarbons I used also urea, guanidine, thiourea, etc. for production of similar oils from chlorinated unsaturated petroleum hydrocarbons. Five to ten percent of these compounds were heated with the petroleum derivatives at one hundred to two hundred degrees centigrade under super-atmospheric pressure produced by nitrogen or other inactive gas, although air can be employed, with stirring. The oils thereby produced were washed with water and filtered for purification. In this connection I may state that I have used the phrase "introduction of the amino group of 'amination'" to cover both introduction of similar imino and amido groupings.

Of course, other combinations of pressures and temperatures, of amino and imino groups, and of specific hydrocarbons, etc., might be extended ad infinitum. I have described only the basic principles of production of this specific type of atmospheric oxidizing hydrocarbons. I used crude petroleum oil in this work as well as light and heavy fuel oils and similar lubricating oils.

I am well aware that oxidation, chlorination and introduction of amino groups into petroleum hydrocarbons are well known to the art, but it is my belief that the methods of synthesis of the specific group of unsaturated chlorinated hydrocarbons, as well as the unsaturated amino hydrocarbons described, and suitable for certain industrial uses or functions, are novel.

I claim:

1. In a process for the synthesis of chlorinated unsaturated petroleum hydrocarbons, the step of partially oxidizing chlorinated petroleum hydrocarbons, by means of oxygen in the presence of an inert gas and with the aid of copper chloride as a catalytic material and at a temperature of one hundred and fifty to four hundred degrees centigrade.

2. In a process for the synthesis of chlorinated unsaturated petroleum hydrocarbons, the step of partially oxidizing chlorinated petroleum hydrocarbons by means of oxygen diluted with nitrogen and with the aid of copper chloride suspended on asbestos as a catalytic material and at a temperature of one hundred and fifty to four hundred degrees centigrade and under superatmospheric pressure.

3. In a process for the synthesis of chlorinated unsaturated petroleum hydrocarbons, the step of partially oxidizing chlorinated petroleum hydrocarbons by means of oxygen diluted with nitrogen and with the aid of copper chloride suspended on asbestos as a catalytic material and at a temperature of one hundred and fifty to four hundred degrees centigrade and under thirty pounds superatmospheric pressure.

4. In a process for the synthesis of chlorinated, unsaturated petroleum hydrocarbons the step of chlorinating petroleum hydrocarbons by means of chlorine and simultaneously selectively oxidizing the said hydrocarbons, for reduction of hydrogen content, by means of oxygen, the latter being present in such equivalent to the hydrochloric acid gas reactionally produced for decomposition of the said acid gas and for permanent selective oxidation of the hydrocarbons that only unsaturated chlorinated hydrocarbons are produced and with the aid of the copper chloride as a catalytic material at one hundred and fifty to four hundred degrees centigrade.

5. In a process for the synthesis of chlorinated, unsaturated petroleum hydrocarbons the step of chlorinating petroleum hydrocarbons by means of chlorine diluted by an inert gas and simultaneously selectively oxidizing the said hydrocarbons, for reduction of hydrogen content, by means of oxygen the latter being present in such equivalent to the hydrochloric gas reactionally produced for decomposition of the said acid gas and for permanent selective oxidation of the hydrocarbons that only unsaturated chlorinated hydrocarbons are produced and with the aid of copper chloride suspended on asbestos as a catalytic material and at one hundred and fifty to four hundred degrees centigrade and under superatmospheric pressure.

6. In a process for the synthesis of chlorinated, unsaturated petroleum hydrocarbons the steps of chlorinating petroleum hydrocarbons by means of chlorine diluted by inert gas and simultaneously selectively oxidizing the said hydrocarbons, for the reduction of hydrogen content, by means of oxygen, the latter being present in such equivalent to the hydrochloric gas reactionally produced for decomposition of the said acid gas and for permanent selective oxidation of the hydrocarbons that only unsaturated chlorinated hydrocarbons are produced and with the aid of copper chloride suspended on asbestos as a catalytic material and at one hundred and fifty to four hundred degrees centigrade and under thirty pounds pressure.

HERMAN B. KIPPER.